March 28, 1950 G. L. HAWKINS ET AL 2,502,257

TAPE APPLYING APPARATUS

Filed Nov. 7, 1947 5 Sheets-Sheet 1

George L. Hawkins,
Parke H. Thompson,
Inventors.
Haynes and Koenig,
Attorneys.

March 28, 1950 G. L. HAWKINS ET AL 2,502,257

TAPE APPLYING APPARATUS

Filed Nov. 7, 1947 5 Sheets-Sheet 2

George L. Hawkins,
Parke H. Thompson,
Inventors.
Haynes and Koenig
Attorneys.

March 28, 1950 G. L. HAWKINS ET AL 2,502,257

TAPE APPLYING APPARATUS

Filed Nov. 7, 1947 5 Sheets-Sheet 3

George L. Hawkins,
Parke H. Thompson,
Inventors.
Haynes and Koenig
Attorneys.

March 28, 1950 G. L. HAWKINS ET AL 2,502,257

TAPE APPLYING APPARATUS

Filed Nov. 7, 1947 5 Sheets-Sheet 4

George L. Hawkins,
Parke H. Thompson
Inventors,
Haynes and Koenig,
Attorneys.

March 28, 1950 G. L. HAWKINS ET AL 2,502,257

TAPE APPLYING APPARATUS

Filed Nov. 7, 1947 5 Sheets-Sheet 5

George L. Hawkins,
Parke H. Thompson,
Inventors.
Haynes and Koenig,
Attorneys.

Patented Mar. 28, 1950 2,502,257

UNITED STATES PATENT OFFICE 2,502,257

TAPE APPLYING APPARATUS

George L. Hawkins and Parke H. Thompson, Kirkwood, Mo.; said Thompson assignor to said Hawkins Application November 7, 1947, Serial No. 784,612

29 Claims. (Cl. 216—2)

This invention relates to tape applying apparatus, and more particularly to apparatus for segmenting and affixing adhesive tape or label strips.

Among the several objects of the invention may be noted the provision of an apparatus adapted rapidly and conveniently to dispense from a continuous supply lengths of adhesive tape and to affix said lengths upon various objects; the provision of apparatus of the class described adapted for labeling purposes adapted to print segmented strips of tape as they are applied; the provision of apparatus such as described particularly adapted for the use without snarling of pressure-sensitive adhesive tape; the provision of apparatus of this class which is small enough to be held in the hand and manually operable by the simple operation of pressing the apparatus against an object; and the provision of apparatus such as described which is economical to manufacture and reliable in operation. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a plan view of an embodiment of the apparatus of this invention for printing and affixing tape labels;

Similar reference characters indicate corresponding parts throughout the several views of the drawings.

Figures 1, 2, 3, 4, 5, 6, 7:
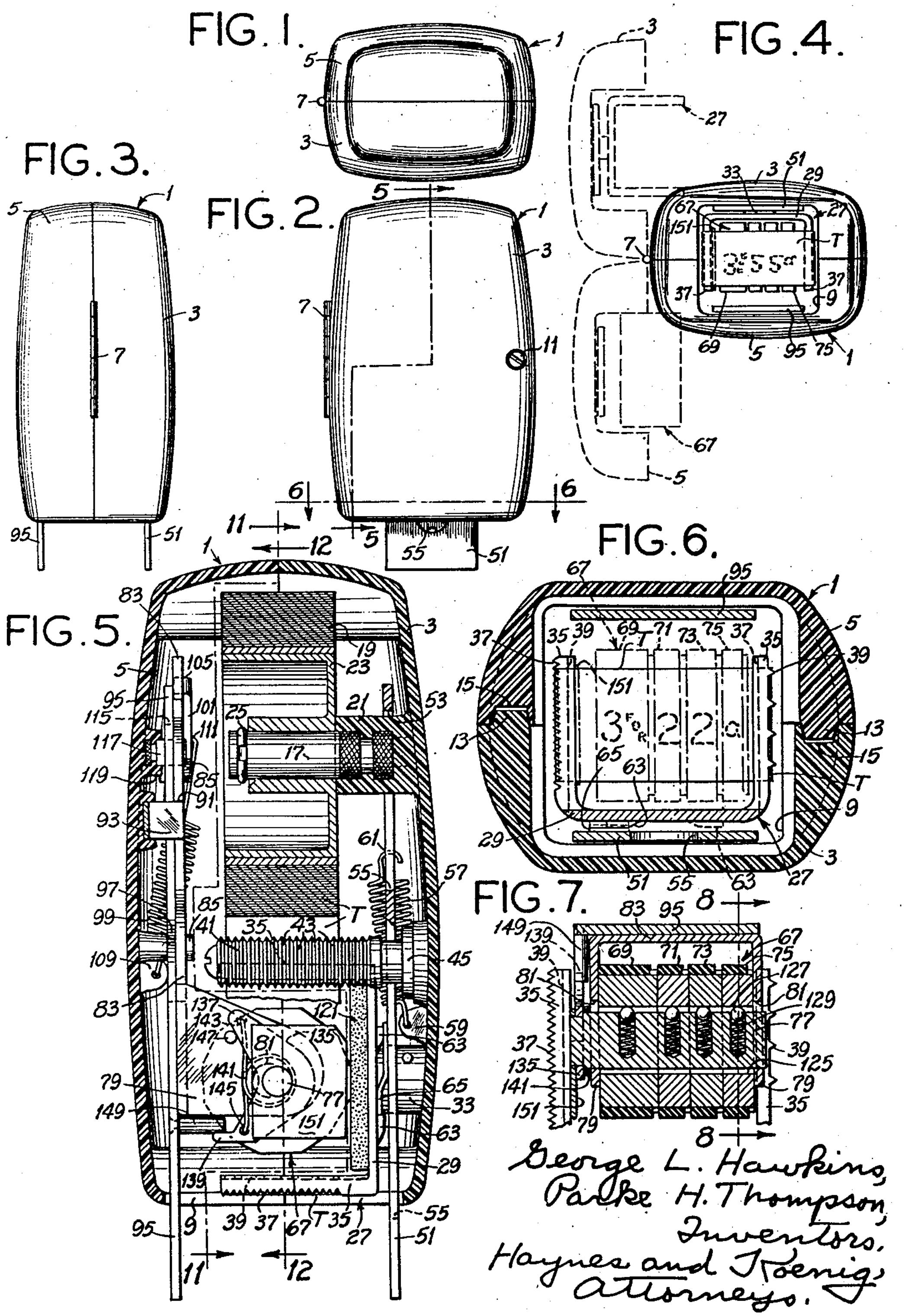
Fig. 2 is a front elevation of Fig. 1.
Fig. 3 is an end elevation of Fig. 2 as viewed from the left.
Fig. 4 is a bottom plan view of Fig. 1, illustrating in dotted lines the manner in which the case of the apparatus is opened.
Fig. 5 is an enlarged vertical section substantially on line 5—5 of Fig. 2.
Fig. 6 is an enlarged horizontal section substantially on line 6—6 of Fig. 2.
Fig. 7 is a horizontal detail section of a printer taken substantially on line 7—7 of Fig. 10.
Figure 9:
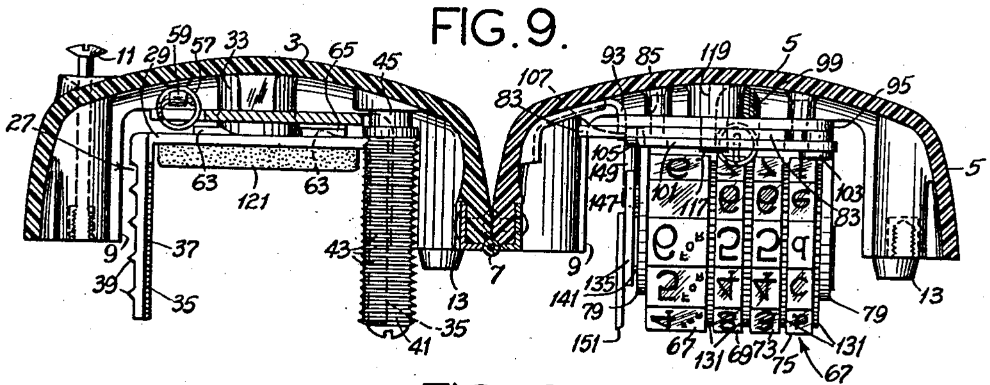
Fig. 9 is a horizontal section taken substantially on line 9—9 of Fig. 10.

The problem of price marking of goods in self-service stores and the like is vexatious because of the wide variety of surfaces to which the marking must be applied and the illegibility of the handwriting of many markers. A partial solution is to apply price stickers. The disadvantage of these is that when preprinted, a large sticker stock must be carried and there is not much flexibility available in the printing. For example, if a stock control index is desired with the price marking, the problem of having on hand the proper number stickers soon is out of hand. Also, ordinary adhesive tape requires moistening, and if the more desirable pressure-sensitive adhesive tape is used, the tendency for this material to snarl must be combatted.

By means of the present invention there is provided a highly flexible scheme for conveniently making use of any unmarked continuous pressure-sensitive tape as pricing and stock-control labeling material.

A broader aspect of the invention is that any pressure-sensitive tape (blank or pre-printed) may very conveniently be applied in short sections for a variety of purposes. For example, draftsmen often use swatches of blank pressure-sensitive adhesive tape for holding down the edges of drawings. By means of the present invention such swatches are, in one operation, conveniently segmented from a continuous supply of tape and without snarling are stuck into holding position.

It is to be understood that the above examples of uses of the invention are only exemplary and many analogous uses will suggest themselves.

Referring to the drawings, Figs. 1–16 illustrate an apparatus embodying the invention for printing labels and adhesively affixing them to an object to be labeled, both in one convenient operation. The apparatus comprises a case 1 of such size and shape that it may be conveniently held in the hand of the user. The case constitutes a support for the operating elements of the apparatus and holds a supply roll of pressure-sensitive adhesive tape T. It consists of two cooperating cup-shaped casing members 3 and 5, preferably molded of plastic material. Members 3 and 5 are hinged together at 7 so that they may be swung apart to open the case for loading with tape or for access to the mechanism therein. The lower end walls of each of members 3 and 5 are notched so that when the case 1 is closed it has a label delivery opening 9 in its lower end. The casing members 3 and 5 are retained in closed position by any suitable locking device, herein illustrated as a screw 11 extending through member 3 and threaded into member 5. The members 3 and 5 are provided at their corners with mating dowels 13 and apertures 15 to maintain alignment of the hinged members.

Within the case 1 is a spindle 17 for rotatably supporting a roll 19 of pressure-sensitive adhesive tape T. The spindle is molded in place in a boss 21 formed on the inside of the side wall of casing member 3 and extends toward the other casing member 5. The tape is wound on a spool 23 which is removably retained on the spindle by any suitable detent, such as a split ring 25 mounted at the free end of the spindle. Thus, an empty spool of tape may be readily removed and replaced by a full spool upon opening the case.

Figure 10:
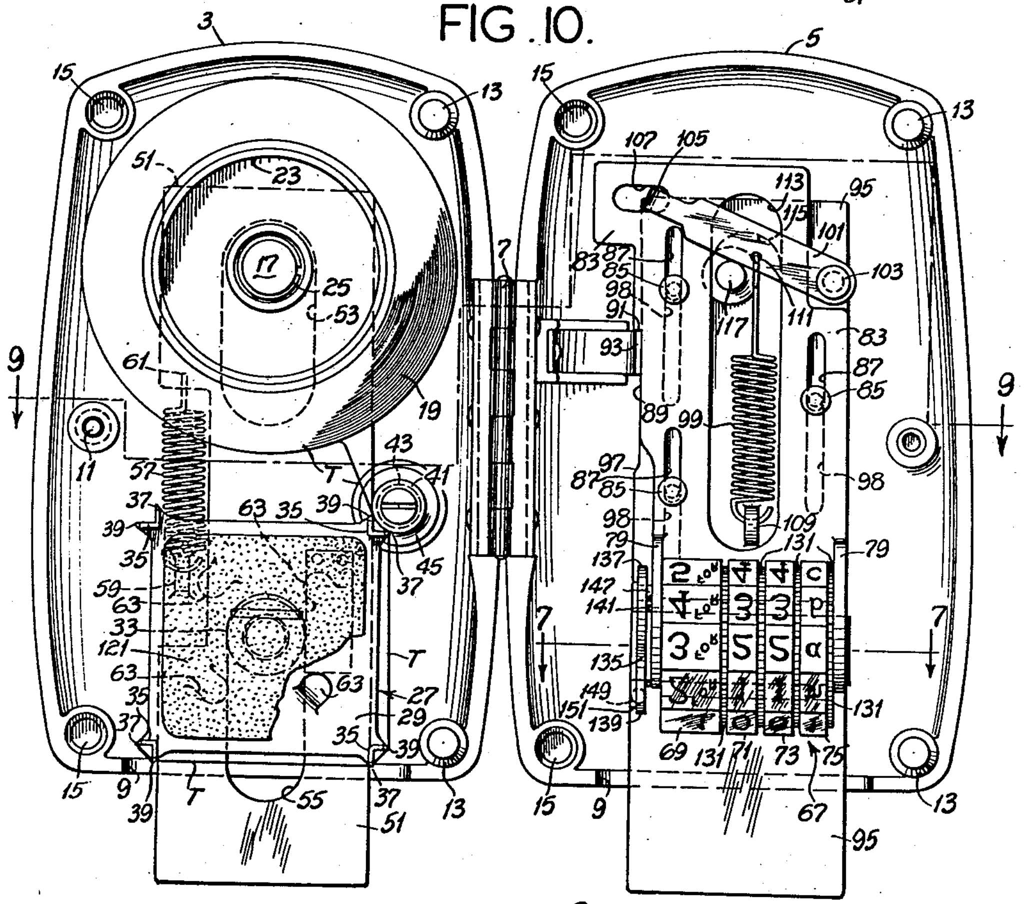
Fig. 10 is an enlarged side elevation of the interior of the apparatus with its case opened.
Figures 11, 12:
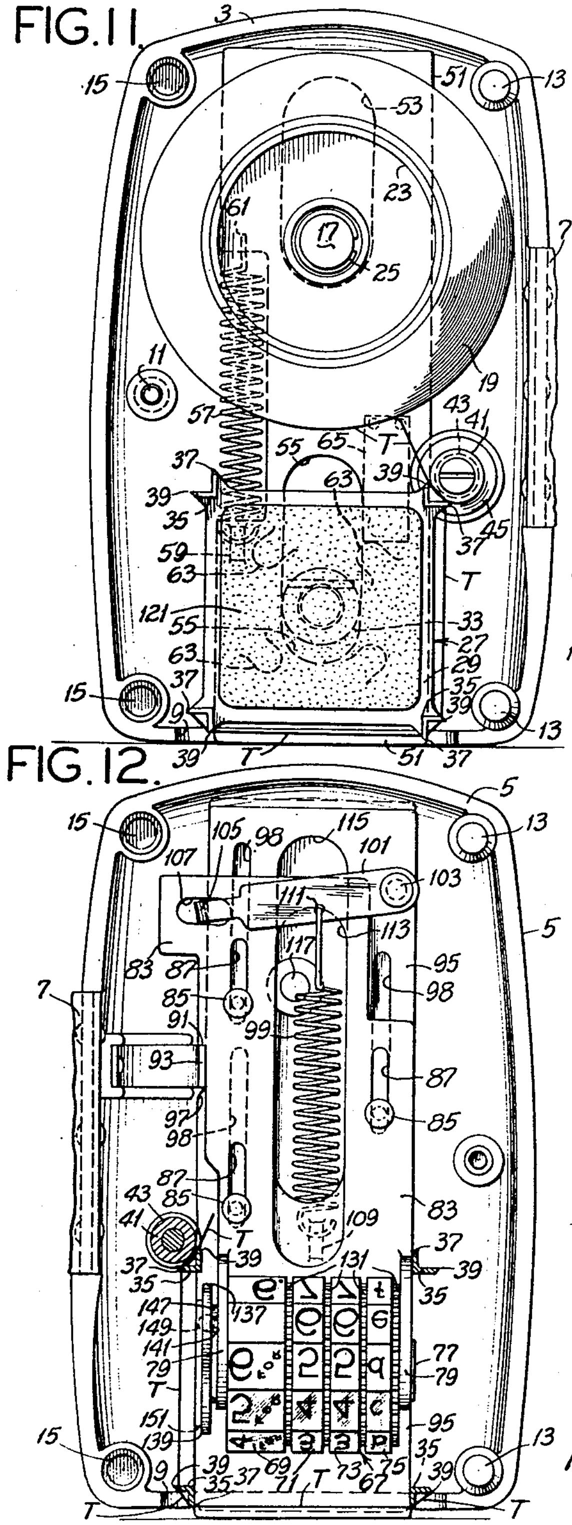
Fig. 11 is a vertical section on line 11—11 of Fig. 5, illustrating a moved position of certain parts of the apparatus.
Fig. 12 is a vertical section on line 12—12 of Fig. 5, illustrating a moved position of other parts just prior to release of a printing stamp of the apparatus.

Mounted within the lower part of the case 1 is a rotary tape feeding and perforating reel generally designated 27. The reel is mounted for rotation on an axis parallel to that of the spindle. It comprises an end head 29 having a central shaft extending into a bearing 33 molded into the side wall of casing member 3. The shaft is rotary in the bearing and suitably retained against axial movement therein. The end head 29 is of square configuration and has a cantilever reel bar 35 extending across the interior of the case from each of its four corners. Thus, there are four such reel bars 35 equally spaced around the periphery of the reel and at the same radii with respect to its axis. Each bar is toothed, for tape perforating and feeding purposes. The axis of the reel 27 is located at such a distance from the lower delivery end of the case 1 that there are four angular positions of the reel, spaced angularly 90°, in which two adjacent reel bars are in registry with the ends of the label delivery opening 9 in the lower end of the case (Figs. 10 and 11). The arrangement is such that the reel may be indexed through 90° intervals successively to advance a length of tape spanning two adjacent bars to an affixing position in registry with the delivery opening 9.

Each reel bar 35 is provided with two rows of teeth 37 and 39 extending parallel to the axis of the reel and pointing outward. The teeth 37 in the leading row are closely spaced while the teeth 39 in the trailing row are relatively few and widely spaced ("leading" and "trailing" referring to the direction of rotation of the reel, which is clockwise as viewed in Figs. 10 and 11). As illustrated, the two rows of teeth are provided by forming the reel bar of angle shape in cross section, the legs of each angle diverging outward with the teeth in the radially outer edge of each leg. The teeth are adapted to pierce tape drawn from the supply roll as it passes between the reel and an idler pressure roller 41. The latter is provided with peripheral annular grooves 43 through which the teeth travel as the reel rotates.

The roller 41 is mounted at 45 for rotation on the side wall of casing member 3 and extends across the interior of the case with its axis parallel to the axes of the tape spool and the reel 27. Its peripheral annular grooves 43 are spaced in accordance with the spacing of teeth 37, with which they interfit. The spacing of teeth 39 is a whole multiple of the spacing of teeth 37 and therefore teeth 39 will also interfit with certain of the grooves 43. Thus the idler roller 41 is so located and its diameter is such that the teeth 37 and 39 on any bar 35 of the reel travel through aligned grooves of the roller as the bar travels away from the spool and down toward the delivery opening 9 in the lower end of the case. As the teeth travel through the grooves, the annular ridges of the idler roller force the tape against the teeth for piercing purposes. The piercing of teeth 37 effect almost but not quite a severance but teeth 39 by reason of their smaller number act only as tape grippers and drivers. As will appear, the right-angular relationship between each set of teeth 37 and 39 when in inter-engagement at the roller has a detent action.

The reel is indexed successively through 90° intervals by a ratcheting drive in response to application of the apparatus to an object to be labeled and its subsequent removal. The ratcheting drive includes a drive member comprising a plate or slide 51 mounted for reciprocation in the case 1 with its lower end extending out of the case through the label delivery opening 9 at one side of the opening (its right side as viewed in Fig. 5). The slide 51 is positioned between the end head 29 of the reel and the side wall of casing member 3. The bosses 21 and 33 on the side wall of casing member 3 extend respectively through upper and lower elongate vertical slots 53 and 55 in the slide for guiding it for reciprocation. The slide is biased downward and outward by a tension spring 57, the lower end of which is connected to a lug 59 formed on the side wall of casing member 3 and the upper end of which is connected to the slide at 61. The slide has an extended limiting position (Figs. 5 and 10) determined by engagement of the upper end of the slot 55 with boss 33, and is retractable into the case against the bias of spring 57 by engaging its lower or outer end with the object to be labeled and moving the case 1 toward the object.

The end head 29 of reel 27 is formed with four ratchet teeth 63 spaced at 90° intervals corresponding to the spacing of reel bars 37. A spring pawl 65 on the slide 51 is cooperable with the ratchet teeth to rotate the reel clockwise, as viewed in Figs. 10 and 11, upon movement of the slide from its retracted position wholly within the case 1 (Fig. 11) to its extended position of Figs. 5 and 10. The arrangement is such that by engaging the outer end of the slide with an object to be labeled and moving the case 1 toward the object, the slide 51, originally in engagement with one of the ratchet teeth 63, is retracted to tension the spring 57 and to cause the pawl 65 to snap behind the next preceding tooth 63. When the apparatus is withdrawn, the spring drives the slide outward and rotates the reel to feed a label length of the tape into registry with the delivery opening 9. At this time a succeeding set of teeth 37 and 39 at the roller 41 provide for detent action.

Also carried within the case 1 is a label printing stamp generally designated 67. As herein illustrated, the printing stamp comprises four rubber printing wheels 69, 71, 73 and 75, each having twelve type faces. The wheels are individually adjustably rotatable on a wheel shaft 77 for changing the type to be printed. The printing stamp is mounted for rotation and lateral translatory movement in a pair of bearing brackets 79, the ends of shaft 77 being supported in horizontally extending elongate slots 81 in the brackets. The brackets are fixed on a plunger plate 83 mounted for reciprocation toward and away from the lower end of the case adjacent the sidewall of casing member 5. The plunger 83 is guided for and limited in its reciprocation by means of headed studs 85 extending from the side wall of casing member 5 through elongate vertical slots 87 in the plunger. The brackets 79 extend into the interior of the reel 27 so that the printing stamp 67 is disposed within the reel, with its axis transverse to the axis of the latter.

The plunger 83 has a notch 89 in one of its vertical edges providing a downwardly facing shoulder 91 for cooperation with a spring detent 93. The latter comprises a curved leaf spring secured to the casing member 5 in position to snap under the shoulder 91 when the plunger is raised to an uppermost retracted position, the plunger being shown in this position in Fig. 10. In this position of the plunger, the printing stamp 67 occupies a retracted position spaced above the lower delivery end of the case 1.

The plunger 83 is controlled by mechanism including a plate or slide 95 which is mounted for vertical reciprocation relative to the case 1 and parallel to the plunger between the plunger and the side wall of casing member 5. The slide is guided for and limited in its reciprocation by means of the studs 85 which extend through elongate vertical slots 98 in the slide. It reciprocates between (1) an extended position (Figs. 5 and 10) wherein its lower end extends out through the label delivery opening 9 for substantially the same distance as the reel-operating slide 51, and at the opposite side of the opening 9 from the slide 51, and (2) a retracted position (Fig. 15) wholly within the case.

The left-hand marginal edge of the slide 95 is formed to provide a cam 97 cooperable with the spring detent 93 when the slide is retracted to move the detent from under shoulder 91 and unlatch the plunger 83. This permits the plunger and the printing stamp 67 thereon to be snapped downward by a tension spring 99 acting on the plunger through a link 101. The link 101 is pivoted at 103 to the slide 95, so that the spring 99 also acts on this slide, and has a loose pivotal connection at 105 with the plunger. The connection 105 may be conveniently formed by bending over the end of the link 101 to extend into an elongate slot 107 in the plunger plate 83. The spring 99 is connected at one end to a lug 109 formed on the side wall of casing member 5 and at its other end to link 101 at 111, intermediate the pivots 103 and 105. It extends through elongate vertical slots 113 and 115 in the plunger 83 and slide 95, respectively. The link 101 is positioned above a pin 117 molded in a boss 119 formed on the side wall of casing member 5 and extending through the slots 113 and 115. Pin 117 functions as a stop and fulcrum for the link in a manner to be described.

The printing stamp 67 is movable with respect to the plunger plate 83 between an inking position wherein selected type faces on printing wheels 69, 71, 73 and 75 engage an inking pad 121 and a printing position wherein the selected type faces register with the label to be printed. The inking pad 121 is mounted on the inside face of the end head 29 of the reel 27 for rotation with the latter. Thus, the pad is rotated through 90° upon each labeling operation so that a fresh portion of the pad is in position for engagement by the printing stamp in the course of the next labeling operation.

Figure 8:
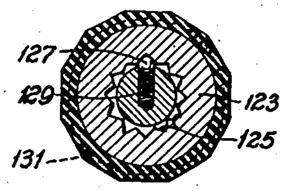
Fig. 8 is a vertical detail section through a printing wheel taken on line 8—8 of Fig. 7.

Each printing wheel is individually rotatably adjustable on the shaft 77 to vary the type to be printed on a label. Each wheel has an annular hub 123 internally formed with twelve axial notches 125 in register with the twelve type faces of the wheel (Figs. 7 and 8). The wheel shaft 77 carries four spring detents, one for each wheel engageable in the notches for latching the wheels in selected position. As illustrated, each detent comprises a ball 127 biased radially outward by a spring 129 disposed in a diametrical recess in the shaft. The hub of each wheel has a peripherally toothed flange 131 for engagement by a pointed tool inserted through delivery opening 9 to rotate the printing wheels to selected position relative to one another.

As herein illustrated, the printing wheels are provided with type for printing prices in dollars and cents, the number of articles for a given price, and inventory code symbols designating, for example, the months of the year. Thus, the first wheel 69 has characters 1. to 6. on six of its faces respectively for dollar indications and the phrases "2 for", "3 for", etc., on five of its faces, the remaining face being blank. The next two wheels 71 and 73 have numerals 0 to 9 on ten faces respectively and two blank faces, for printing values in cents. The fourth wheel 75 has letters of the alphabet thereon as inventory code symbols. Twelve faces are provided to afford different symbols for the twelve months of the year. It will be understood that the wheels are selectively adjustable on shaft 77 to provide any desired combination of characters on four axially aligned type faces of the four wheels. As shown in the drawings, the combination of characters or line of type adjusted to be printed reads "3 for 22*a*" ("*a*," for example, being the code symbol for the month of January). Obviously other numbers of wheels and characters may be used.

The apparatus includes mechanism operable in response to retraction of the slide 95 into the case for moving away from the inking pad 121 the line of type to be printed and rotating the printing stamp to a position wherein the line of type is directly above the label length of tape in labeling position. This mechanism comprises a bell crank lever 135 fixed on an end of the wheel shaft 77 outward of the bracket 79 which is adjacent that end of the shaft. Lever 135 has arms 137 and 139. A wire spring 141 has one end fixed in the bracket 79 at 143, its intermediate portion coiled around the end of shaft 77, and its other end connected to the arm 139 at 145 in such manner that the spring biases the bell crank 135 and shaft 77 for clockwise rotation and translation to the left (away from the inking pad 121) as viewed in Figs. 5, 13 and 14. Rotation of the bell crank is limited to 90° by a stop pin 147 extending from the bracket 79 for engagement by bell crank arm 137 or 139.

Figure 14:
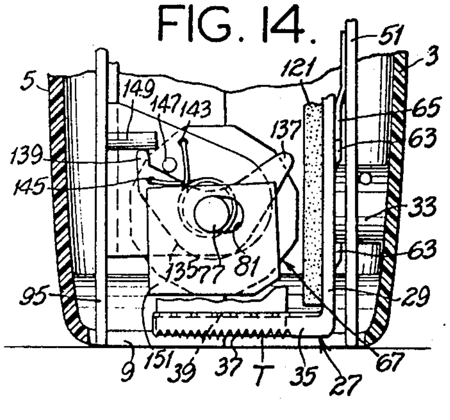
Fig. 14 is a fragmentary section corresponding to Figs. 5 and 13, illustrating a further advanced position of the parts.

The bell crank 135 is maintained in its Fig. 5 position, wherein its arm 137 engages stop pin 147 and shaft 77 is at its right-hand limit in bearing slots 81, by a finger 149 on the slide 95 when the latter is in its fully extended position. This finger is so located on the slide as to engage the end of bell crank arm 139 and hold the crank in the position of Fig. 5 against the bias of spring 141 until the slide is retracted. In this position of the bell crank, the line of type to be printed is maintained against the inking pad 121 and angularly spaced 90° from registry with the delivery opening 9. When slide 95 is retracted relatively to the case, finger 149 moves relatively upward away from the end of crank arm 139. Spring 141 thereupon functions to move the bell crank in such manner that the shaft 77 is first moved to the left end of bearing slots 81 and is then rotated clockwise through 90° until the bell crank arm 139 engages the pin 147 (Fig. 14). The movement of the shaft to the left withdraws the line of type to be printed from the inking pad, and the rotation of the shaft rotates the line of type clockwise through 90° into printing position with respect to the end of the tape which is in labeling position. When the slide moves outward, finger 149 again engages the end of bell crank arm 139 to return the parts to the inking position.

Operation of the apparatus of Figs. 1–16 is as follows:

The original positions of all operating parts are as illustrated in Figs. 5 and 10. The adhesive tape T is threaded from the supply roll around the tape feeding reel 27 with its adhesive side to the outside with respect to the reel. Two label lengths of the tape extend around the reel. The trailing one of these lengths extends from the leading set of teeth 37 of the reel bar 35 adjacent idler roller 41 to the leading set of teeth 37 of the next reel bar 35 in clockwise direction as viewed in Fig. 10. The leading one of these label lengths spans the rows of teeth 37 of the next two successive reel bars which are in register with delivery opening 9 in the delivery end of case 1.

To print and affix a label, the case parts 3 and 5 are closed and the outer ends of the slides 51 and 95 are engaged with the object to be labeled. The object and case 1 are then moved relatively toward one another, as by simply pushing the case. This causes the slides to be retracted or pushed in relative to the case. Usually the object to be labeled is held in fixed position and the case 1 moved toward it, but it will be understood that the case 1 may be held fixed and the object moved toward it to retract or push in the slides.

Figure 13:
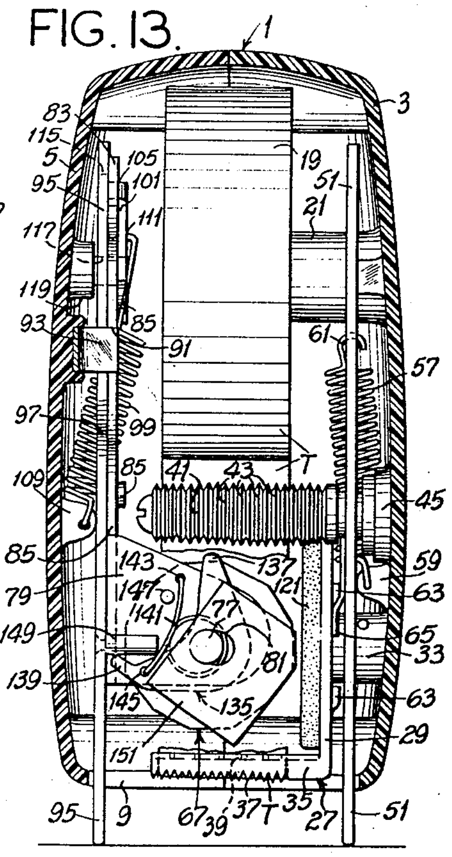
Fig. 13 is a vertical section corresponding to Fig. 5, illustrating parts in an intermediate position during a labeling operation.

As the slide 95 is retracted relative to the case 1, the finger 149 is moved relatively upward away from the end of the arm 139 of the bell crank 135. The wire spring 141 thereupon biases the bell crank, shaft 77 and the printing wheels thereon to the left away from the inking pad 121 so that the line of type about to be printed ("3 for 22$a$") is moved to the left to clear the inking pad. Shaft 77 moves to the left until stopped by the left ends of the bearing slots 81. As the finger 149 continues to move upward relative to the end of arm 139, shaft 77 is rotated clockwise by wire spring 141 acting through the bell crank 135. Fig. 13 illusrates the shaft 77 in its left-hand limiting position and partially rotated, slide 95 being partially retracted.

The slide 95 and finger 149 are ultimately retracted to the point where bell crank lever 135 has rotated clockwise through 90° as determined by engagement of bell crank arm 139 with stop pin 147 (Fig. 14). Thus, the shaft 77 and the printing wheels thereon are rotated through 90° from their initial angular positions of Figs. 5 and 10. Hence the line of type to be printed ("3 for 22$a$") now faces downward above the portion of the tape which is in labeling position.

As the slide 95 is retracted (as above described) the pivot 103 for the link 101 moves upward relative to the case 1. The plunger plate 83 is initially in its uppermost retracted position, as determined by engagement of the lower ends of the slots 87 therein with studs 85, and is latched against downward movement by engagement of the spring detent 93 under shoulder 91 (Fig. 10). Consequently, the pivot 105 remains relatively fixed (except for some sliding movement of the bent-over end of the link in the slot 107). Thus the link 101 is rocked counterclockwise about its pivot 105 to tension the spring 99. This action occurs until the cam 97 on the slide 95 is about to engage the spring detent 93, as illustrated in Fig. 12.

The slide 95 is ultimately retracted to the point at which cam 97 disengages the detent 93 from under shoulder 91. This releases the plunger 83, which is thereupon snapped downward by the loaded spring 99 acting through the link 101. The slide 95 is retained in fully retracted position (Fig. 15) due to its lower end bearing against the object being labeled and, consequently, the pivot 103 for link 101 remains relatively fixed to permit this action of the link.

Figure 15:
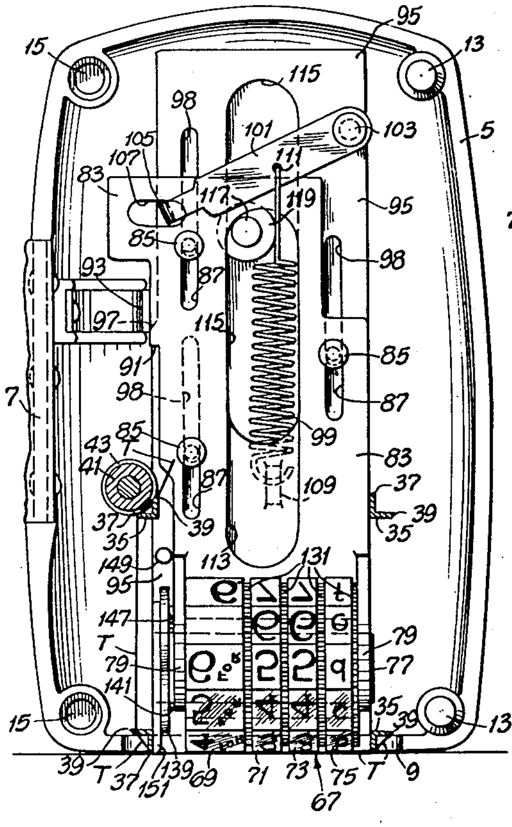
Fig. 15 is a section corresponding to Fig. 12, illustrating the printing stamp in released position.

As the plunger 83 is driven downward, it drives the printing stamp 67 comprising the assembly of printing wheels downward against the end of the tape stretched between the two lowermost reel bars, as illustrated in Fig. 15. As previously pointed out, the printing wheels are now in printing position with the selected line of type to be printed facing the end of the tape. The line of type is also inked, since it has just been moved from inking engagement with the inking pad 121. Consequently, the length of the tape stretched between the two lowermost bars is printed and also pressed against and adhesively affixed to the object being labeled.

Figure 17:
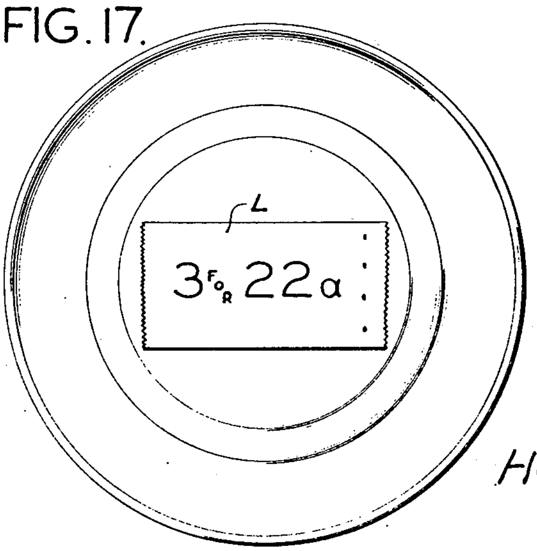
Fig. 17 is a plan view of a label as printed and detached as applied to an object such as a can.

If the tensile strength of the tape is not too great, the snap-acting force of the blow struck by the printing wheels upon the end length of the tape is usually sufficient to tear the end length of tape from the remainder at the line of perforations in the tape formed by the row of teeth 37 on the reel bar 35 at the trailing end of the delivery opening 9. If the force of this blow is not sufficient, a tearing blade 151 may be provided to deliver a localized blow upon the tape just adjacent the line of perforations. As illustrated, this blade may be carried by the bell crank 135 for movement therewith. The severed end length of tape thus forms the printed label L illustrated in Fig. 17.

As the object to be labeled and the case 1 are moved relatively toward one another as above described, the slide 51 is also retracted relative to the case. This retracts the pawl 65 behind the next preceding ratchet tooth 63 on the end head 29 of reel 27 and loads the spring 57, as illustrated in Fig. 11. While the pawl has a tendency to rotate the reel 27 in the reverse direction, due to its frictional engagement with the end head of the reel, reverse rotation of the reel is prevented by the detaining action of the idler roller 41 upon the short curved length of the tape spanning the two sets of teeth 37 and 39 of the reel bar 35 at the idler roller.

Upon separation of the case 1 and the now labeled object, both of the slides 51 and 95 are biased outward to their extended positions of Figs. 5 and 10 by the springs 57 and 99, respectively. As the slide 51 moves outward relative to the case from its Fig. 11 position, the pawl 65 thereon engages the ratchet tooth 63 corresponding to the reel bar 35 at the idler roller 41 and rotates the tape feed reel 27 in clockwise direction. This pulls tape from the supply roll, the widely spaced teeth 39 of the reel bar piercing (without tearing) the tape. This is for pulling purposes so that there is no strain upon the tape at the line of perforations formed by teeth 37. Pulling the tape by means of the relatively few teeth 39 of the reel bar prevents the tape from being torn at the line of perforations formed by teeth 37. The reel rotates clockwise through 90° and stops at a reel bar 35 moves into position at the idler roller 41. This is due to the detent action of the idler roller 41 upon the short, curved length of tape which now spans the two sets of teeth 37 and 39 of the bar. Rotation of the reel through 90° moves a pair of reel bars into registry with the delivery opening 9 in the lower end of case 1 and thus delivers the length of tape spanning these bars into labeling position. Thus, the apparatus functions to deliver the end portion of the tape into labeling position upon withdrawal of the apparatus from the object being labeled after a preceding label has been applied. Rotation of the reel through 90° also rotates the inking pad 121 carried thereby through 90° to present a fresh surface of the pad for engagement by printing stamp 67.

As the slide 95 moves outward relative to the case 1 from its Fig. 15 position, the finger 149 on the slide engages the end of the bell crank arm 139 to rock the bell crank 135, wheel shaft 77 and the printing wheels counterclockwise against the bias of wire spring 141 and through 90° as determined by engagement of the bell crank arm 137 with stop pin 147. Thus, the selected line of type ("3 for 22$a$") is rotated back into opposition to the inking pad 121. Spring 141 thereupon functions to bias the bell crank, wheel shaft and printing wheels bodily back to the right to move the line of type into inking engagement with ink pad 121.

Figure 16:
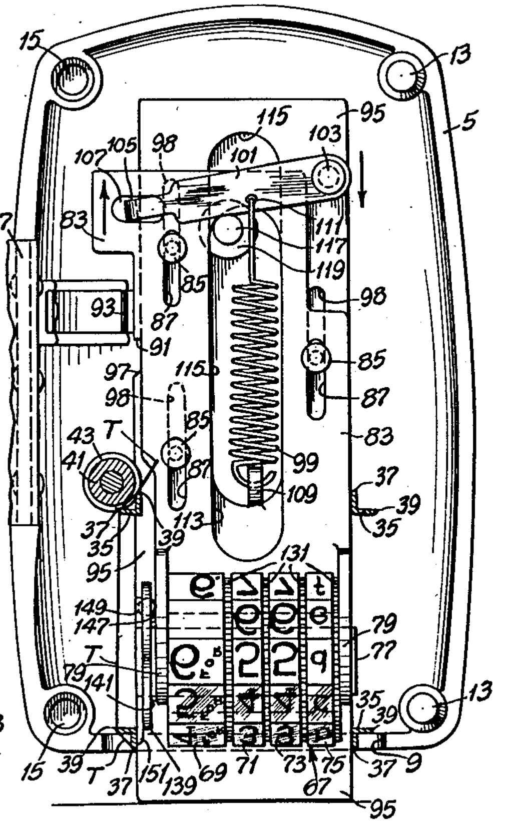
Fig. 16 is a section corresponding to Figs. 12 and 15, illustrating the printing stamp and associated parts in an intermediate position during retraction thereof.

During the initial phase of the outward movement of slide 95, the plunger plate 83 remains fixed in its extended position as determined by engagement of the upper ends of slots 87 in the plate with studs 85 (Fig. 15). Thus, the pivot 105 remains relatively fixed during this initial phase, and spring 99 rocks link 101 about the center at 105 to pull the slide 95 down. This action continues until the link 101 strikes the pin 117, as illustrated in Fig. 16. The spring 99 then functions to rock the link clockwise about its point of engagement with pin 117 to continue pulling the slide 95 down and also to pull the plunger plate 83 and printing stamp 67 thereon upward (note the direction arrows in Fig. 16). This action continues until the parts are returned to their initial positions of Figs. 5 and 10 with spring detent 93 engaged under shoulder 91 of the plunger plate 83 and with slide 95 in its fully extended position.

Figures 18, 19, 20:
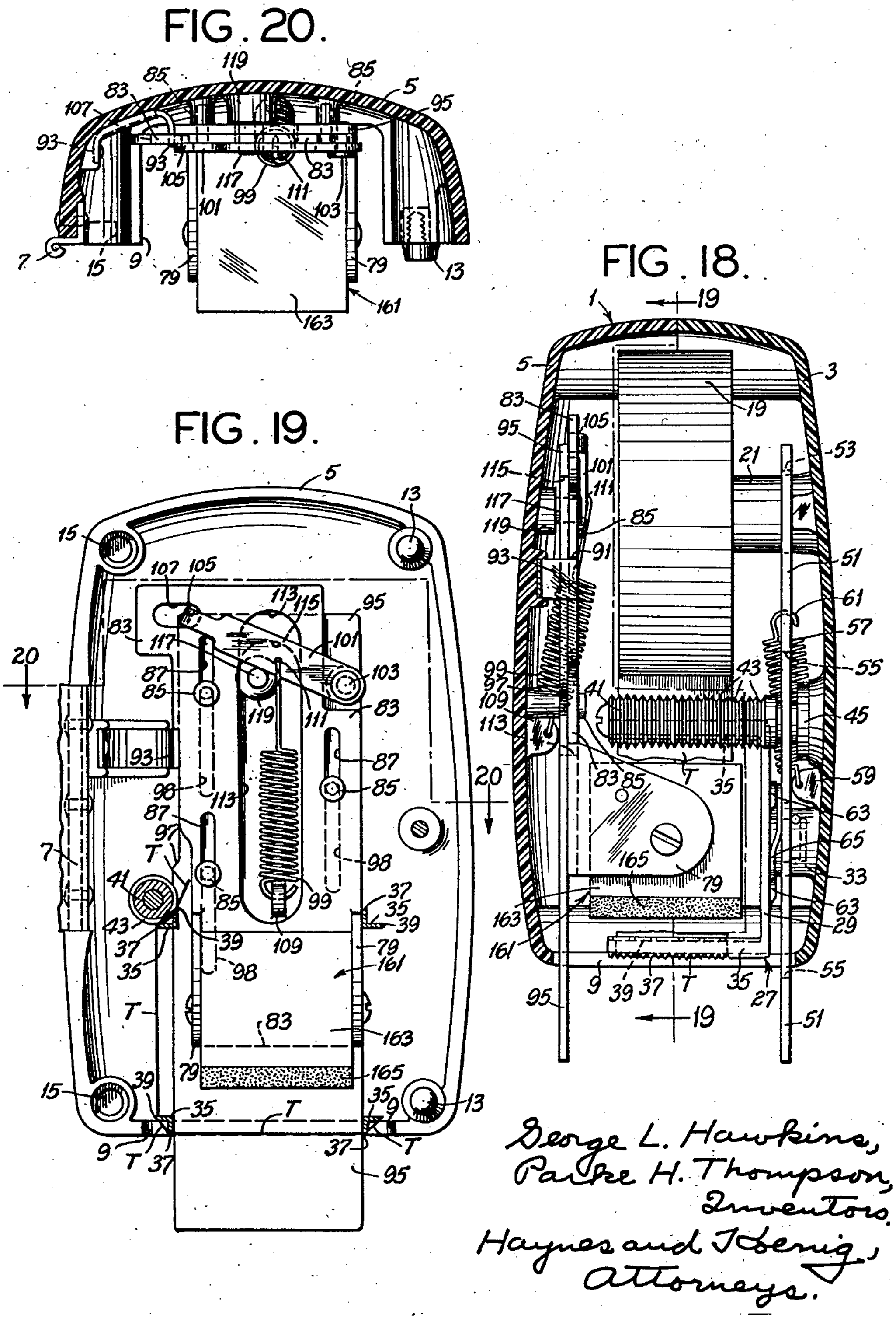
Fig. 18 is a vertical section similar to Fig. 5 of an alternative non-printing embodiment of the invention.
Fig. 19 is a section substantially on line 19—19 of Fig. 18.
Fig. 20 is a section substantially on line 20—20 of Fig. 19.

Figs. 18–20 illustrate an alternative embodiment of the invention for applying pre-printed labels from a continuous printed adhesive tape, or for applying unprinted tape for fastening or like purposes. This embodiment is identical to the Figs. 1–16 embodiment in all respects except that the printing stamp of Figs. 1–16 and the control mechanism therefor is removed and replaced by a simple, non-rotary label or tape presser 161. This presser comprises a block 163 fixed in place between the brackets 79 and having a lowermost rubber pressing pad 165. The apparatus of Figs. 18–20 functions in all respects like the apparatus of Figs. 1–16 except, of course, that the presser 161 remains fixed relative to the plunger 83 and merely tears away and presses the end of the tape against an object, but does not print it.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. In apparatus of the class described, a tape feeding and perforating device comprising a reel having peripherally spaced tape-engaging bars, each of said bars having a row of closely spaced, outwardly pointing teeth for forming a line of perforations across the tape at which line the tape may be readily torn apart, and a parallel row of widely spaced, outwardly pointing teeth for piercing the tape for tape-pulling purposes.

2. In apparatus of the class described, a support, a tape feeding and perforating device comprising a reel rotative on the support and having peripherally spaced tape-engaging bars, each of said bars having a row of closely spaced, outwardly pointing teeth for forming a line of perforations across the tape at which line the tape may be readily torn apart, and a parallel row of widely spaced, outwardly pointing teeth for piercing the tape for tape-pulling purposes, and an idler roller mounted on the support on an axis parallel to the axis of the reel and having annular peripheral grooves through which the teeth of the reel bars travel in the course of rotation of the reel.

3. In apparatus of the class described, a support, a tape feeding and perforating device comprising a reel rotative on the support and having peripherally spaced tape-engaging bars, each of said bars having a row of closely spaced, outwardly pointing teeth for forming a line of perforations across the tape at which line the tape may be readily torn apart, and a parallel row of widely spaced, outwardly pointing teeth for piercing the tape for tape-pulling purposes, and an idler roller mounted on the support on an axis parallel to the axis of the reel and having annular peripheral grooves through which the teeth of the reel bars travel in the course of rotation of the reel, the row of closely spaced teeth of each bar leading the row of widely spaced teeth of each bar in respect to the direction of rotation of the reel.

4. In apparatus of the class described, a support, a plunger having a tape presser thereon mounted for reciprocation on the support, a detent on the support cooperable with the plunger for latching it in a retracted position, a detent-operating slide mounted for reciprocation on the support parallel to the plunger, a link pivotally connected at its ends to the plunger and slide, respectively, a spring fixed at one end to the support and connected at its other end to the link, and a stop on the support for the link toward which the link is biased by said spring.

5. In apparatus of the class described, an indexing tape feeding device for withdrawing indexed lengths of adhesive tape from a continuous supply and feeding the end length of the tape to a delivery position, a tape presser mounted for movement from a retracted position to strike the end length of the tape in delivery position, a spring for driving the presser against the tape, and mechanism for loading the spring while holding the presser in retracted position and then releasing the presser member to be driven against the end length of the tape by the spring.

6. In apparatus of the class described, an indexing tape feeding device for withdrawing indexed lengths of adhesive tape from a continuous supply and feeding the end length of the tape to a delivery position, an inking pad, a printing stamp mounted for movement from a retracted inking position in engagement with the pad to strike the end length of the tape in delivery position, a spring for driving the printing stamp against the tape, and mechanism for loading the spring while holding the printing stamp in retracted position and then releasing the stamp to be driven against the end length of the tape by the spring.

7. In apparatus of the class described, a tape feeding device for withdrawing adhesive tape from a continuous supply and feeding the end length of the tape to a delivery position, indexing drive mechanism for the tape feeding device including a drive spring, a tape presser mounted for movement from a retracted position to strike the end of the tape in delivery position, a spring for driving the presser against the tape, mechanism for loading the springs while holding the presser in retracted position and then releasing the presser member to be driven against the end of the tape by its spring, said mechanism thereupon being releasable to permit the tape feeding device to be driven by its drive spring to feed another length of tape into delivery position.

8. In apparatus of the class described, a tape feeding device for withdrawing adhesive tape from a continuous supply and feeding the end length of the tape to a delivery position, indexing drive mechanism for the tape feeding device including a drive spring, an inking pad, a printing stamp mounted for movement from a retracted inking position in engagement with the pad to strike the end of the tape in delivery position, a spring for driving the stamp against the tape, mechanism for loading the springs while holding the stamp in retracted position and then releasing the stamp to be driven against the end of the tape by its spring, said mechanism thereupon being releasable to permit the tape feeding device to be driven by its drive spring to feed another length of tape into delivery position.

9. In apparatus of the class described, an indexing tape feeding device for withdrawing indexed lengths of adhesive tape from a continuous supply and feeding the end length of the tape to a delivery position, said device including means for forming a line of perforations across the tape spaced from its end, a tape presser mounted for movement from a retracted position to strike the end length of the tape in delivery position and tear it away from the supply at the line of perforations, a spring for driving the presser against the tape, and mechanism for loading the spring while holding the presser in retracted position and then releasing the presser member to be driven against the end length of the tape by the spring.

10. In apparatus of the class described, an indexing tape feeding device for withdrawing indexed lengths of adhesive tape from a continuous supply and feeding the end length of the tape to a delivery position, said device including means for forming a line of perforations across the tape spaced from its end, an inking pad, a printing stamp mounted for movement from a retracted inking position in engagement with the pad to strike the end length of the tape in delivery position and tear it away from the supply at the line of perforations, a spring for driving the stamp against the tape, and mechanism for loading the spring while holding the stamp in retracted position and then releasing the stamp to be driven against the end length of the tape by the spring.

11. In apparatus of the class described, a tape feeding device for withdrawing adhesive tape from a continuous supply and feeding the end of the tape to a delivery position, said tape feeding device including means for forming a line of perforations across the tape spaced from its end, indexing mechanism for the tape feeding device including a drive spring, a tape presser mounted for movement from a retracted position to strike the end of the tape in delivery position and tear it away from the supply at the line of perforations, a spring for driving the presser against the tape, mechanism for loading the springs while holding the presser in retracted position and then releasing the presser member to be driven against the end of the tape by its spring, said mechanism thereupon being releasable to permit the tape feeding device to be driven by its drive spring to feed another length of tape into delivery position.

12. In apparatus of the class described, a tape feeding device for withdrawing adhesive tape from a continuous supply and feeding the end of the tape to a delivery position, said tape feeding device including means for forming a line of perforations across the tape spaced from its end, indexing mechanism for tape feeding device including a drive spring, an inking pad, a printing stamp mounted for movement from a retracted inking position in engagement with the pad to strike the end of the tape in delivery position and tear it away from the supply at the line of perforations, a spring for driving the stamp against the tape, mechanism for loading the springs while holding the stamp in retracted position and then releasing the stamp to be driven against the end of the tape by its spring, said mechanism thereupon being releasable to permit the tape feeding device to be driven by its drive spring to feed another length of tape into delivery position.

13. In apparatus of the class described, a holder for a roll of adhesive tape, a tape feeding and perforating reel rotary on the holder and having peripherally spaced toothed tape-engaging bars, said reel being rotatable successively to deliver an end length of adhesive tape spanning two adjacent bars from the roll to a delivery position, a tape presser carried by the holder for movement within the reel from a retracted position to strike the said end length of tape in delivery position, a spring for driving the tape presser against the tape, and mechanism for loading the spring with the presser held in retracted position and then releasing the presser to be driven by the spring against the tape.

14. In apparatus of the class described, a holder for a roll of adhesive tape, a tape feeding and perforating reel rotary on the holder and having peripherally spaced toothed tape-engaging bars, said reel being rotatable successively to deliver an end length of adhesive tape spanning two adjacent bars from the roll to a delivery position, a tape presser carried by the holder for movement within the reel from a retracted position to strike the said end length of tape in delivery position, a spring for driving the tape presser against the tape, and mechanism for loading the spring with the presser held in retracted position and then releasing the presser to be driven by the spring against the tape, said mechanism including a detent for latching the presser in retracted position and a slide reciprocable on the holder for loading the spring and then releasing the detent.

15. In apparatus of the class described, a holder for a roll of adhesive tape, a tape feeding and perforating reel rotary on the holder and having peripherally spaced toothed tape-engaging bars, said reel being rotatable successively to deliver an end length of adhesive tape spanning two adjacent bars from the roll to a delivery position, a tape presser carried by the holder for movement within the reel from a retracted position to strike the said end length of tape in delivery position, a spring for driving the tape presser against the tape, mechanism for loading the spring with the presser held in retracted position and then releasing the presser to be driven by the spring against the tape, and a pawl and ratchet indexing drive for the reel including a sliding pawl reciprocable on the holder.

16. In apparatus of the class described, a holder for a roll of adhesive tape, a tape feeding and perforating reel rotary on the holder and having peripherally spaced toothed tape-engaging bars, said reel being rotatable successively to deliver an end length of adhesive tape spanning two adjacent bars from the roll to a delivery position, a tape presser carried by the holder for movement within the reel from a retracted position to strike the said end length of tape in delivery position, a spring for driving the tape presser against the tape, mechanism for loading the spring with the presser held in retracted position and then releasing the presser to be driven by the spring against the tape, said mechanism including a detent for latching the presser in retracted position and a slide reciprocable on the holder for loading the spring and then releasing the detent, and a pawl and ratchet indexing drive for the reel including a sliding pawl reciprocable on the holder.

17. In apparatus of the class described, a holder for a roll of adhesive tape, a tape feeding and perforating reel rotary on the holder and having peripherally spaced toothed tape-engaging bars, said reel being rotatable successively to deliver an end length of tape spanning two adjacent bars from the roll to a delivery position, a printing stamp carried by the holder for movement within the reel from a retracted inking position in engagement with an inking pad carried by the holder to strike the end length of tape in delivery position, a spring for driving the stamp against the tape, and mechanism for loading the spring with the stamp held in retracted position and then releasing the stamp to be driven by the spring against the tape.

18. In apparatus of the class described, a holder for a roll of adhesive tape, a tape feeding and perforating reel rotary on the holder and having peripherally spaced toothed tape-engaging bars, said reel being rotatable successively to deliver an end length of tape spanning two adjacent bars from the roll to a delivery position, an inking pad carried by the reel for rotation therewith, a printing stamp carried by the holder for movement within the reel from a retracted inking position in engagement with the inking pad to strike the end length of tape in delivery position, a spring for driving the stamp against the tape, and mechanism for loading the spring with the stamp held in retracted position and then releasing the stamp to be driven by the spring against the tape.

19. In apparatus of the class described, a holder for a roll of adhesive tape, a tape feeding and perforating reel rotary on the holder and having peripherally spaced toothed tape-engaging bars, said reel being rotatable successively to deliver an end length of tape spanning two adjacent bars from the roll to a delivery position, a printing stamp carried by the holder for movement within the reel from a retracted inking position in engagement with an inking pad carried by the holder to strike the end length of tape in delivery position, a spring for driving the stamp against the tape, and mechanism for loading the spring with the stamp held in retracted position and then releasing the stamp to be driven by the spring against the tape, said mechanism including a detent for latching the stamp in retracted position and a slide reciprocable on the holder connected to the spring for loading it and having means thereon for releasing the detent when the spring is loaded.

20. In apparatus of the class described, a holder for a roll of adhesive tape, a tape feeding and perforating reel rotary on the holder and having peripherally spaced toothed tape-engaging bars, said reel being rotatable successively to deliver an end length of tape spanning two adjacent bars from the roll to a delivery position, a printing stamp carried by the holder for movement within the reel from a retracted inking position in engagement with an inking pad carried by the holder to strike the end length of tape in delivery position, a spring for driving the stamp against the tape, mechanism for loading the spring with the stamp held in retracted position and then releasing the stamp to be driven by the spring against the tape, and a pawl and ratchet drive for the reel including a spring-biased sliding pawl reciprocable on the holder.

21. In apparatus of the class described, a holder for a roll of adhesive tape, a tape feeding and perforating reel rotary on the holder and having peripherally spaced toothed tape-engaging bars, said reel being rotatable successively to deliver an end length of tape spanning two adjacent bars from the roll to a delivery position, a printing stamp carried by the holder for movement within the reel from a retracted inking position in engagement with an inking pad carried by the holder to strike the end length of tape in delivery position, a spring for driving the stamp against the tape, and mechanism for loading the spring with the stamp held in retracted position and then releasing the stamp to be driven by the spring against the tape, said mechanism including a detent for latching the stamp in retracted position and a slide reciprocable on the holder connected to the spring for loading it and having means thereon for releasing the detent when the spring is loaded, and a pawl and ratchet drive for the reel including a spring-biased sliding pawl reciprocable on the holder.

22. In combination, a case having a delivery opening, a holder for a roll of adhesive tape in the case, a tape feeding reel in the case having peripherally spaced, toothed tape-engaging bars, said reel being adapted successively to deliver an end length of tape spanning two adjacent bars on the reel from the roll into registry with the opening, a tape presser disposed within the reel and mounted in the case for movement from a retracted position to strike the said end length of tape in delivery position, a spring for driving the presser against the tape, mechanism for loading the spring with the presser held in retracted position and then releasing the presser to be driven by the spring against the tape, and mechanism in the case for indexing the reel to feed a fresh length of tape into delivery position after actuation of the presser.

23. In combination, a case having a delivery opening, a holder for a roll of adhesive tape in the case, a tape feeding reel in the case having peripherally spaced, toothed tape-engaging bars, said reel being adapted successively to deliver an end length of tape spanning two adjacent bars on the reel from the roll into registry with the opening, a tape presser disposed within the reel and mounted in the case for movement from a retracted position to strike the said end length of tape in delivery position, a spring for driving the presser against the tape, mechanism for loading the spring with the presser held in retracted position and then releasing the presser to be driven by the spring against the tape, including a slide extending out of the case at one side of the delivery opening, said slide being movable into the case to load the spring and then release the presser, and pawl and ratchet indexing mechanism for indexing the reel including a sliding pawl, and a spring biasing the pawl to a position extending out of the case at the other side of the delivery opening, said pawl being movable into the case to bias its spring, and movable out of the case under the bias of its spring to rotate the reel through one indexing step.

24. In apparatus of the class described, a case consisting of two separable casing members, said case having a delivery opening, a roll holder for a roll of adhesive tape mounted within one casing member, a tape feeding and perforating reel having peripherally spaced toothed tape-engaging bars mounted for rotation in said one casing member in position to deliver an end length of the tape spanning two successive reel bars from the roll to a delivery position in registry with the delivery opening with the adhesive side of the tape facing the opening, a tape presser carried by the other casing member for movement within the reel from a retracted position to strike the back of the end length of tape in delivery position, a spring connected to the presser for driving it against the tape, a presser actuating member slidable in said other casing member, mechanism in said other casing member controlled by said presser actuating member for loading said spring with the presser held in retracted position and then releasing the presser to be driven against the tape by the spring upon movement of the presser actuating member in one direction, and pawl and ratchet indexing mechanism for the reel comprising a ratchet on the reel, a pawl engageable with the ratchet slidable in said one casing member, and a spring biasing the pawl in reel-rotating direction.

25. In apparatus of the class described, a case consisting of two separable casing members, said case having a delivery opening, a roll holder for a roll of adhesive tape mounted within one casing member, a tape feeding and perforating reel having peripherally spaced toothed tape-engaging bars mounted for rotation in said one casing member in position to deliver an end length of the tape spanning two successive reel bars from the roll to a delivery position in registry with the delivery opening with the adhesive side of the tape facing the opening, a tape presser carried by the other casing member for movement within the reel from a retracted position to strike the back of the end length of tape in delivery position, a spring connected to the presser for driving it against the tape, a presser actuating member slidable in said other casing member, mechanism in said other casing member controlled by said presser actuating member for loading said spring with the presser held in retracted position and then releasing the presser to be driven against the tape by the spring upon movement of the presser actuating member in one direction, and pawl and ratchet indexing mechanism for the reel comprising a ratchet on the reel, a pawl engageable with the ratchet slidable in said one casing member, and a spring biasing the pawl in reel-rotating direction, said slidable presser actuating member extending out of the case at one side of the delivery opening, said slidable pawl extending out of the case at the other side of the delivery opening.

26. In apparatus of the class described, a support, a tape feeding and perforating device comprising a reel rotative on the support and having peripherally spaced tape-engaging bars, each of said bars having a row of closely spaced, outwardly pointing teeth for forming a line of perforations across the tape at which line the tape may be readily torn apart, and a parallel row of widely spaced, outwardly pointing teeth for piercing the tape for tape-pulling purposes, an idler roller mounted on the support on an axis parallel to the axis of the reel and having annular peripheral grooves through which the teeth of the reel bars travel in the course of rotation of the reel, the row of closely spaced teeth of each bar leading the row of widely spaced teeth of each bar in respect to the direction of rotation of the reel, and pawl and ratchet mechanism for indexing the reel including ratchet teeth on the reel, a slide reciprocable on the support, a pawl on the slide engageable with the ratchet teeth for rotating the reel step-by-step in tape feeding direction, the idler roller preventing reverse rotation of the reel.

27. In apparatus of the class described, a support, a tape feeding and perforating device comprising a reel rotative on the support and having peripherally spaced tape-engaging bars, each of said bars having a row of closely spaced, outwardly pointing teeth for forming a line of perforations across the tape at which line the tape may be readily torn apart, and a parallel row of widely spaced, outwardly pointing teeth for piercing the tape for tape-pulling purposes, an idler roller mounted on the support on an axis parallel to the axis of the reel and having annular peripheral grooves through which the teeth of the reel bars travel in the course of rotation of the reel, the row of closely spaced teeth of each bar leading the row of widely spaced teeth of each bar in respect to the direction of rotation of the reel, and pawl and ratchet mechanism for indexing the reel including ratchet teeth on the reel, a slide reciprocable on the support, a pawl on the slide engageable with the ratchet teeth for rotating the reel step-by-step in tape feeding direction, the idler roller preventing reverse rotation of the reel, and a spring connected to the slide for biasing it to move the pawl in reel-rotating direction.

28. In apparatus of the class described, a holder for a roll of adhesive tape, a tape perforating and feeding reel rotary on the holder, said reel comprising a head at one end and toothed tape-engaging bars extending from the head spaced around the reel periphery, the other end of the reel being open, said reel being rotatable step-by-step to deliver an end length of tape spanning two adjacent reel bars from the roll to a delivery position, a plunger mounted for reciprocation on the support adjacent the open end of the reel in a path perpendicular to the axis of the reel toward and away from the end length of tape in delivery position, a presser on the plunger extending into the open end of the reel, a spring for driving the plunger toward the end length of tape in delivery position, and means for holding the plunger in a retracted position, loading the spring and then releasing the plunger to be driven toward the end length of tape in delivery position.

29. In apparatus of the class described, a holder for a roll of adhesive tape, a tape perforating and feeding reel rotary on the holder, said reel comprising a head at one end and toothed tape-engaging bars extending from the head spaced around the reel periphery, the other end of the reel being open, said reel being rotatable step-by-step to deliver an end length of tape spanning two adjacent reel bars from the roll to a delivery position, a plunger mounted for reciprocation on the support adjacent the open end of the reel in a path perpendicular to the axis of the reel toward and away from the end length of tape in delivery position, an inking pad carried by the reel head within the reel facing the plunger, a printing stamp carried by the plunger within the reel, said stamp being mounted on the plunger for rotation about an axis parallel to the face of the pad and parallel to the end length of tape in delivery position, and for translation transverse to its axis toward and away from the pad, a spring connected to the plunger for driving it toward the end length of tape in delivery position, a detent for holding the plunger in a retracted position, a control member reciprocable on the holder for loading the spring and then releasing the detent, and means controlled by said control member as it is moved to load the spring acting on the printing stamp to move the printing stamp in translation away from the pad and then to rotate the stamp to a position wherein the inked face of the stamp faces the end length of tape in delivery position.

GEORGE L. HAWKINS.
PARKE H. THOMPSON.

REFERENCES CITED

The following references are of record in the file of this patent:

UNITED STATES PATENTS

| Number | Name | Date |
|---|---|---|
| 993,732 | Stork | May 30, 1911 |
| 1,108,729 | Fischer | Aug. 25, 1914 |
| 1,265,642 | Folger et al. | May 7, 1918 |
| 1,294,132 | McClure | Feb. 11, 1919 |
| 1,724,074 | Dubelle | Aug. 13, 1929 |
| 1,812,980 | Penney | July 7, 1931 |
| 2,079,080 | Melind | May 4, 1937 |
| 2,312,727 | Nisenson | Mar. 2, 1943 |